United States Patent [19]

Ayroldi

[11] Patent Number: 4,514,299

[45] Date of Patent: Apr. 30, 1985

[54] APPARATUS FOR THE RECOVERY OF OILS OR OTHER SIMILAR POLLUTANTS FLOATING ON BODIES OF WATER, INCLUDING THE OPEN SEAS

[76] Inventor: Giuseppe Ayroldi, Via Guido Zanobini, N. 55, Rome, Italy

[21] Appl. No.: 585,231

[22] Filed: Mar. 1, 1984

[30] Foreign Application Priority Data

Mar. 1, 1983 [IT] Italy .................... 47828 A/83

[51] Int. Cl.³ .................. E02B 15/04; C02F 1/40
[52] U.S. Cl. .................. 210/242.3; 210/242.4; 210/523; 210/923
[58] Field of Search ............ 210/776, 242.3, 538, 210/540, 923, 242.4, 523

[56] References Cited

U.S. PATENT DOCUMENTS

| | | | |
|---|---|---|---|
| 2,608,300 | 8/1952 | Small | 210/523 |
| 3,426,902 | 2/1969 | Kilpert | 210/776 |
| 3,612,277 | 10/1971 | Van Stavern | 210/776 |
| 3,693,805 | 9/1972 | Tillett | 210/776 |
| 3,701,430 | 10/1972 | Tuttle | 210/923 |
| 3,716,142 | 2/1973 | Bianchi | 210/242.3 |
| 3,822,789 | 7/1974 | Crisafulli | 210/242.3 |
| 4,100,072 | 7/1978 | Uchida | 210/923 |
| 4,116,833 | 9/1978 | Stagemeyer | 210/776 |
| 4,182,679 | 1/1980 | Van Hekle | 210/242.3 |
| 4,264,444 | 4/1981 | Bronnec | 210/242.3 |

FOREIGN PATENT DOCUMENTS 2029254  3/1980  United Kingdom ........... 210/242.3

Primary Examiner—Ernest G. Therkorn
Attorney, Agent, or Firm—Bernard, Rothwell & Brown

[57] ABSTRACT

An apparatus for the recovery of oils or other similar pollutants floating on bodies of water, including the open seas, and a related support vessel, including a conveying apparatus and a recovery unit for the floating oils which both float autonomously and independently of each other and from the support vessel. The conveying apparatus includes two self-buoyant arms disposed in the shape of a V, flexible with respect to a vertical plane to ride the waves, and towed by the support vessel by means of two swinging forks. The recovery unit comprises two large rotating, horizontal axis drums, surrounded on the lateral and the rear sides by an apron to contain the floating oils, and is towed by the support vessel to float independently. Pumping means for the recovered oils is provided.

5 Claims, 5 Drawing Figures

APPARATUS FOR THE RECOVERY OF OILS OR OTHER SIMILAR POLLUTANTS FLOATING ON BODIES OF WATER, INCLUDING THE OPEN SEAS

BACKGROUND OF THE INVENTION

1. Field of the Invention

The present invention provides an apparatus for the recovery of oils floating on a body of water, and specifically from the open seas, to be maneuvered by a support vessel.

2. Prior Art

Many and very serious are the damages which, from the ecological viewpoint, are caused to the marine environment by the losses and the discharges at sea of oily substances and from the hydrocarbons in particular.

Various types of machines have already been studied and experienced to solve this problem, but none of these has, until now, given an actual and feasible solution to it. The machines thought to mechanically recover the floating oils from the open seas have shown themselves, in fact, barely efficient and difficult to use, while the so-called "sinkers" or "dispersants" cause very serious damages to the marine environment.

Already known, in particular, are devices which can be called of a "moistening" or "adhesive" type, as, for instance, a system including disks or drums rotating about a horizontal axis, or systems including a belt in continuous motion. Such devices are caused to be lapped during their rotating or continuous movement by the surface layer of the oil which adheres onto their surface and which is removed by the use of scraping blades. However, when used in the open seas, these devices have a very low or completely void yield, chiefly due to the fact that they are mounted on an inner portion of their support vessel, where the polluted floating layer cannot easily arrive or where the oil on the water, which eventually enters, is shaken by the vessel's movements.

Even when these recovery devices are assembled on the outer side of the vessel, their efficiency is very poor because of the fact that they are rigidly connected with the vessel and they are therefore compelled to follow its movements so that they continuously splash the polluted surface of the sea (at least when the sea conditions are not completely calm) so that the oil is shaken with the water and the collecting drum (or disk, or belt) is continuously washed.

SUMMARY OF THE INVENTION

The present invention provides an apparatus which aims to overcome the aforementioned problems, since it is adapted to recover the oils, even from the open seas and in rough weather conditions, with good overall yield and with an outstanding operating ease. The system includes a conveying apparatus formed by two floating arms disposed in the shape of a V, flexible with respect to a vertical plane, to be able to ride the waves and be towed by the support vessel by means of two swinging forks, and of a recovery unit of the adhering type, separate from the vessel and self-floating independently of the vessel to freely follow the changing shape of the surface of the sea. This recovery unit is connected to the support vessel by means of a swinging fork which allows a reciprocal free buoyancy both for the vessel and the recovery unit.

DETAILED DESCRIPTION OF THE PREFERRED EMBODIMENT

Figure 1:
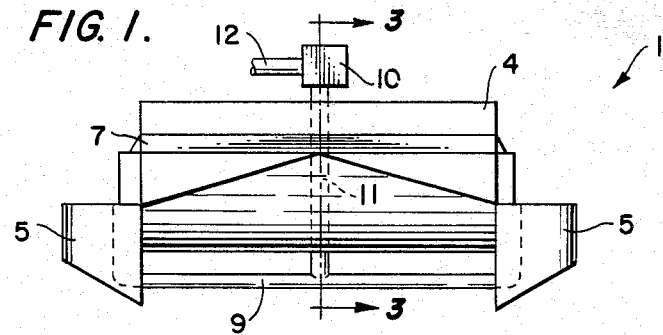
FIG. 1 is a front elevation view of the recovery unit of this invention.
Figure 2:
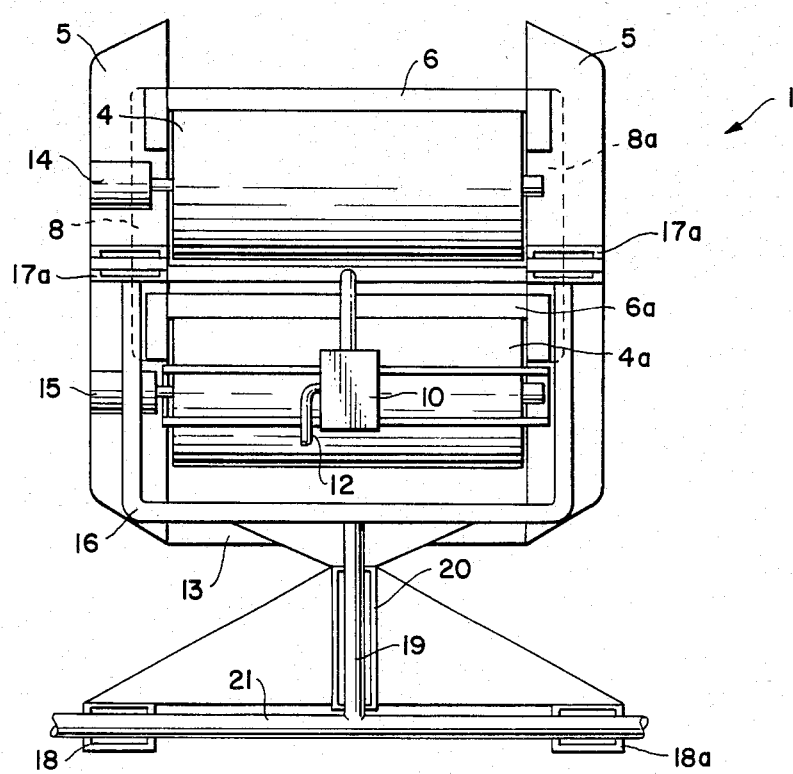
FIG. 2 is a top plan view of the recovery unit.
Figure 3:
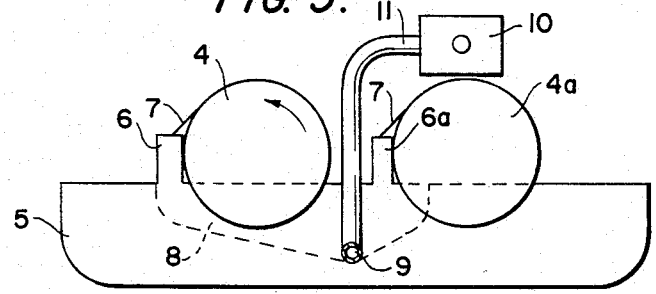
FIG. 3 is the cross-section taken on line 3—3 of FIG. 1.

With reference to the drawings and to the preferred embodiment shown in FIGS. 1-5, FIG. 4 shows the general arrangement of a conveying apparatus 2, with recovery unit 1, and with the support vessel 3.

The conveying apparatus 2 includes two self-floating arms 22 disposed in the shape of a V, towed by the vessel 3 by means of two swinging forks 23 hinged on the front part of the arms by pivot 25, while the rear parts of the two arms 22 are linked to each other by means of a rod 26. The angular opening of the two floating arms 22 can be adjusted for each specific operating condition by simply varying the angular opening of the two swinging forks 23.

To make certain these arms will be flexible on their vertical axis to be able to ride the waves while being rigid along the horizontal plane, they are made of a flexible material (such as neoprene or polyurethane elastomer) and have very large horizontal dimensions, while their vertical thickness is much smaller and slowly increases when shifting towards their rear parts, to ensure the containment of the oil layer which the arms themselves convey toward the recovery unit.

To further improve the flexibility of these two arms together with their buoyancy, they are provided with a plurality of holes 27 in their bodies (FIG. 5) so as to diminish their weight while augmenting, at the same time, their flexibility which is related, of course, to the physical characteristics of the material and to its thickness. The large horizontal width of the floating arms will prevent their bending in the horizontal plane, so that the correct working of the arms is always ensured.

The recovery unit 1 includes two horizontal cylindrical drums 4, 4a which are rotated by two motors 14, 15, preferably of the hydraulic or pneumatic types for safety reasons. The recovery unit includes two "gondolas" or side hulls 5, 5. Inside the side hulls are two small wells 8, 8a for collecting the oils. The side hulls 5, 5, together with a rear wall 13, form an apron which surrounds the recovery unit on three sides. A horizontal pipe 9 connects the two small wells 8, 8a. Two scraping blades 7, 7 (see FIG. 3) scrape the drums 4, 4a and let the oil flow into two transverse collecting channels 6, 6a, and then into the two side wells 8 and 8a.

The recovery unit 1 is towed by the support vessel 3 by means of a swinging fork assembly 28 which is mounted on the recovery unit and on the support vessel. This swinging fork assembly includes hinges 18 and 18a on the support vessel which, together with hinges 17 and 17a on the recovery unit, ensure the total and reciprocal floating independence of the support vessel and the recovery unit.

A further hinge 20, with its axis normal with respect to the preceding ones, is put along the rod 19 of the fork 21 so that it will be possible for the recovery unit to freely go up and down and to rotate along its longitudinal axis with action of the waves and independently from the movements of the support vessel.

This apparatus operates as follows: A large band of the polluted liquid (surface oil on ocean water) is directed by the front conveying unit 2 towards the entrance of the recovery unit. Most of the oil is caused to contact the surface of the first drum 4 which (like the other ones) is partially immersed in the water and rotates in the direction shown by the arrow. The oil that is thus contacted by the surface of the first drum will adhere to it, for a well-known physical effect as practiced in the art and will follow the drum during its rotation.

The oil layer will then be removed from the drum 4 by means of stationary inclined blade scraper 7, the edges of which lean with a light friction along the surface of the revolving drum 4.

The oil which the first drum 4 has not been able to collect has the very high possibility of being collected by the second drum 4a, which works in the same way as the preceding one.

The side and rear aprons 5, 13 have the specific purpose of containing the oils directed by the front conveying unit, thus allowing the two drums to work more efficiently and reduce to the minimum the possibility that the oil which enters the unit will not be recovered and will be lost out the back of the unit.

Figure 4:
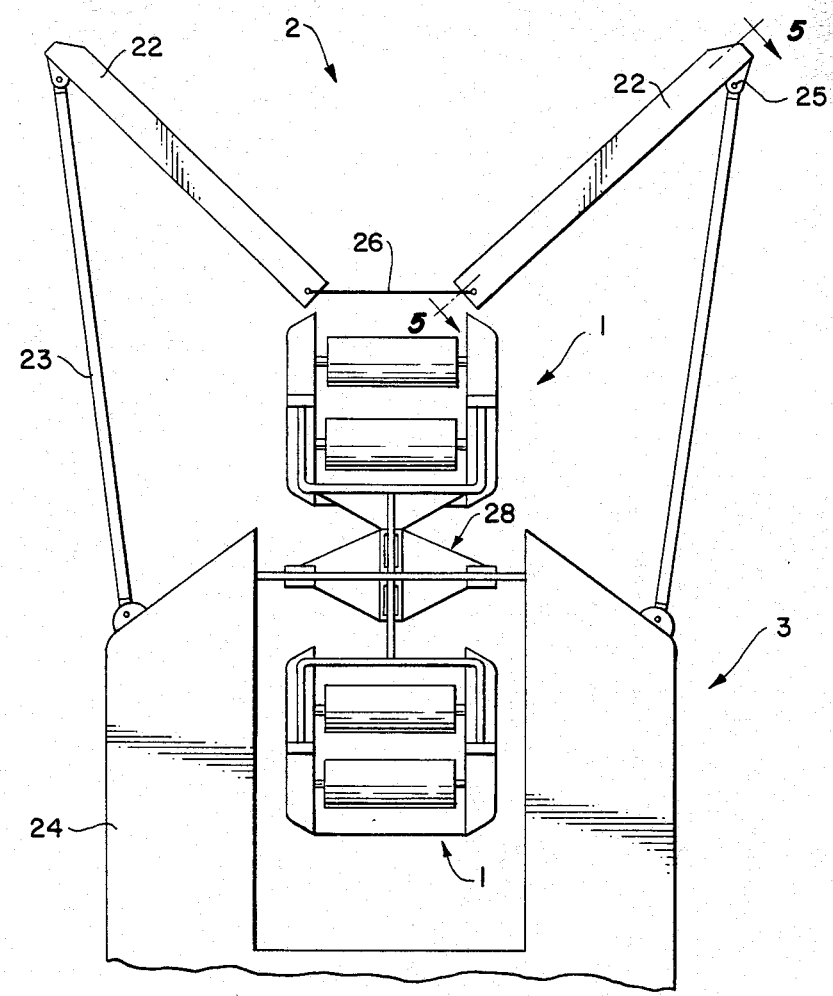
FIG. 4 is a top view of the apparatus according to the invention.
Figure 5:
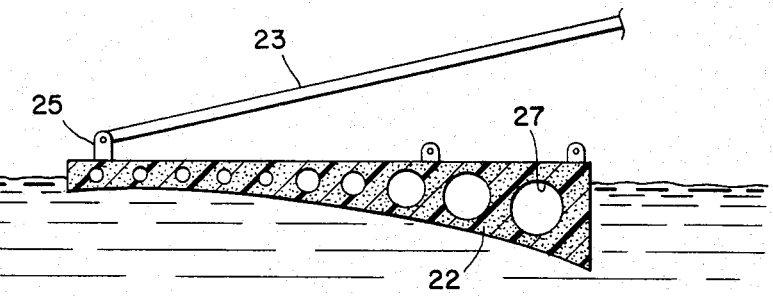
FIG. 5 is a cross-section taken on line 5—5 of FIG. 4.

If very large amounts of oils are to be recovered, a second recovery unit which is similar to the first can be mounted, i.e., as is shown in FIG. 4. This recovery system is very dependable.

Differently, in fact, from what has been done previously, both the conveying unit and the recovery unit can freely ride the waves, so that they are able to operate on a layer of non-disturbed oil, while the characteristic apron which surrounds the drums creates around them a small calm and containment basin of the oils which can be picked up with relative ease.

The recovery units may also be positioned not only between the hulls of a catamaran, but on the sides of a single hull vessel, with appropriate modification of the linking means between the recovery unit and the support vessel.

I claim:

1. An apparatus for the recovery of fluid substances or the like floating on water and even in open seas, comprising:

(a) a conveying apparatus adapted to be moved on the water by a support vessel, the conveying apparatus including two flexible floating arms which are more flexible in a vertical plane than in a longitudinal plane, the floating arms being linked to each other in their rear parts by a rod and assuming the shape of a V;

(b) swinging forks for connecting the conveying apparatus to the support vessel, the swinging forks allowing the conveying apparatus and the support vessel to float independently of each other;

(c) a self-floating recovery unit adapted to be moved on the water by said support vessel, the recovery unit including a rotating horizontal drum for recovery of said floating fluid substances, an apron around the sides and rear of the drum for containing a layer of the floating fluid substances directed towards the drum by the floating arms of the conveying apparatus, and means for removing fluid substances from the drum after being recovered by the drum; and (d) means for connecting the recovery unit to the support vessel, the means including a swinging fork which allows the recovery unit and the support vessel to float independently of each other, and the means further including a hinge which allows the recovery unit to rotate about its longitudinal axis independently of the support vessel.

2. An apparatus according to claim 1, wherein the flexible arms on the conveying apparatus are more flexible at their tip in a vertical plane than at their base.

3. An apparatus according to claim 1, in which the recovery unit includes two hollow rotating drums, which contribute to the buoyancy of the recovery unit, and wherein the apron includes collecting well means to receive the fluid substances recovered by the drums.

4. Apparatus as in claim 3 wherein the collecting well means includes two wells, one in each side of the apron, the wells being connected to each other by a horizontal pipe, which is connected to a pumping unit to pump away the recovered fluid substances.

5. An apparatus according to claim 3, wherein the floating arms of the conveying apparatus and the oil recovery unit are towed by the support vessel through hinged forks which allow the conveying apparatus, the recovery unit and the support vessel to float autonomously and independently of each other.

* * * * *